(12) United States Patent
Fujita

(10) Patent No.: US 6,271,819 B1
(45) Date of Patent: Aug. 7, 2001

(54) METHOD FOR DRIVING ELECTRO-OPTICAL DISPLAY DEVICE

(75) Inventor: Masanori Fujita, Tokyo (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/133,269

(22) Filed: Aug. 13, 1998

Related U.S. Application Data

(63) Continuation of application No. 07/973,558, filed on Nov. 9, 1992, now Pat. No. 5,825,346.

(30) Foreign Application Priority Data

Apr. 4, 1985 (JP) .................................................. 60-71621
Nov. 18, 1985 (JP) ................................................ 60-258152

(51) Int. Cl.[7] .............................................. G09G 3/18
(52) U.S. Cl. .............................. 345/95; 345/96; 345/97; 345/209; 345/210
(58) Field of Search .............................. 345/87, 112, 89, 345/94, 95–97, 208–209, 210; 349/33, 34, 36, 37, 49

(56) References Cited

U.S. PATENT DOCUMENTS

| 4,655,561 | * | 4/1987 | Kanbe et al. | 345/97 |
| 4,715,688 | * | 12/1987 | Harada et al. | 349/34 |
| 5,092,665 | * | 3/1992 | Kanbe et al. | 349/34 |

\* cited by examiner

Primary Examiner—Lun-Yi Lao
(74) Attorney, Agent, or Firm—Adams & Wilks

(57) ABSTRACT

A matrix of display elements is driven on a time sharing basis to switch between two optically distinct states in response to a pulse train applied to the selected display elements. The pulse train includes display control pulses having a duration and electric field effective to set the display elements to the desired optically distinct state, and does not allow, after the application of the display control pulse, existence of a pulse which would change the optical state, and also includes a plurality of pulses having the same pulse shapes in different polarities. AC pulses which hold the optical state are applied to the display elements after the application of the display control pulse. The AC pulses are obtained by superposing high frequency AC pulses to the AC pulses having an amplitude lower than the display control pulse.

18 Claims, 13 Drawing Sheets

METHOD FOR DRIVING ELECTRO-OPTICAL DISPLAY DEVICE

This is a continuation of application Ser. No. 07/973,558, filed on Nov. 9, 1992, now U.S. Pat. No. 5,825,346.

BACKGROUND OF THE INVENTION

The present invention relates to a method for driving an electro-optical display device such as ferroelectric liquid crystal, dence etc.

Recently, the ferroelectric liquid crystal is drawing attentions of researchers as a successor of the TN type liquid crystal and a display device utilizing such a ferroelectric liquid crystal is currently researched.

The display mode of ferroelectric liquid crystal is categorized into the complex refraction type display mode and guest host type display mode. In the case of driving a display device of such modes, the driving method which has been employed for the conventional TN type liquid crystal cannot be used because the display condition (brightness of display) is controlled by changing the direction of applied electric field, unlike the conventional TN type liquid crystal. Namely, when a voltage, although it may be low level, is continuously applied even in one direction, the ferroelectric liquid crystal may at last respond to such voltage. Therefore, a special driving method is necessary for such display mode.

The driving methods which have been developed so far sometimes allow, during time-shared non-selected period, repeated application of small amplitude pulses having the polarity opposite to that of a pulse for display, and trigger drop of contrast in case that a number of digits to be displayed increases.

Moreover, a voltage to be applied is not a perfect AC voltage and a voltage of the one polarity is applied longer than a voltage of the polarity. Accordingly, there arises a problem that if a device is driven for a long period of time, the transparent electrode for display may be blackened or double color pigment may be discolored or liquid crystal may by deteriorated.

It Since the conventional driving methods are followed by such problems, these methods cannot be considered as the definitive method and therefore advent of the optimum driving method has long been expected.

Moreover, it has been supposed to be difficult to gene rate the intermediate tone in display for the ferroelectric liquid crystal and a driving method for generating the gradation has not yet been developed.

SUMMARY OF THE INVENTION

It is an object of the present invention to provide a method for driving an electro-optical display device which prevents even after a long period of driving that the transparent electrode is blackened, double color pigment is discolored and liquid crystal is deteriorated.

It is another object of the present invention to provide a method for driving an electro-optical display device which does not bring about drop of contrast even in case a number of digits increases.

It is further object of the present invention to provide a method for driving an electro-optical display device which can generate an intermediate tone of display.

It is still further object of the present invention to provide a method for driving an electro-optical display device which shortens the period of time-sharing driving and remarkably increases a number of digits for display.

DESCRIPTION OF THE PREFERRED EMBODIMENTS

Figure 1:
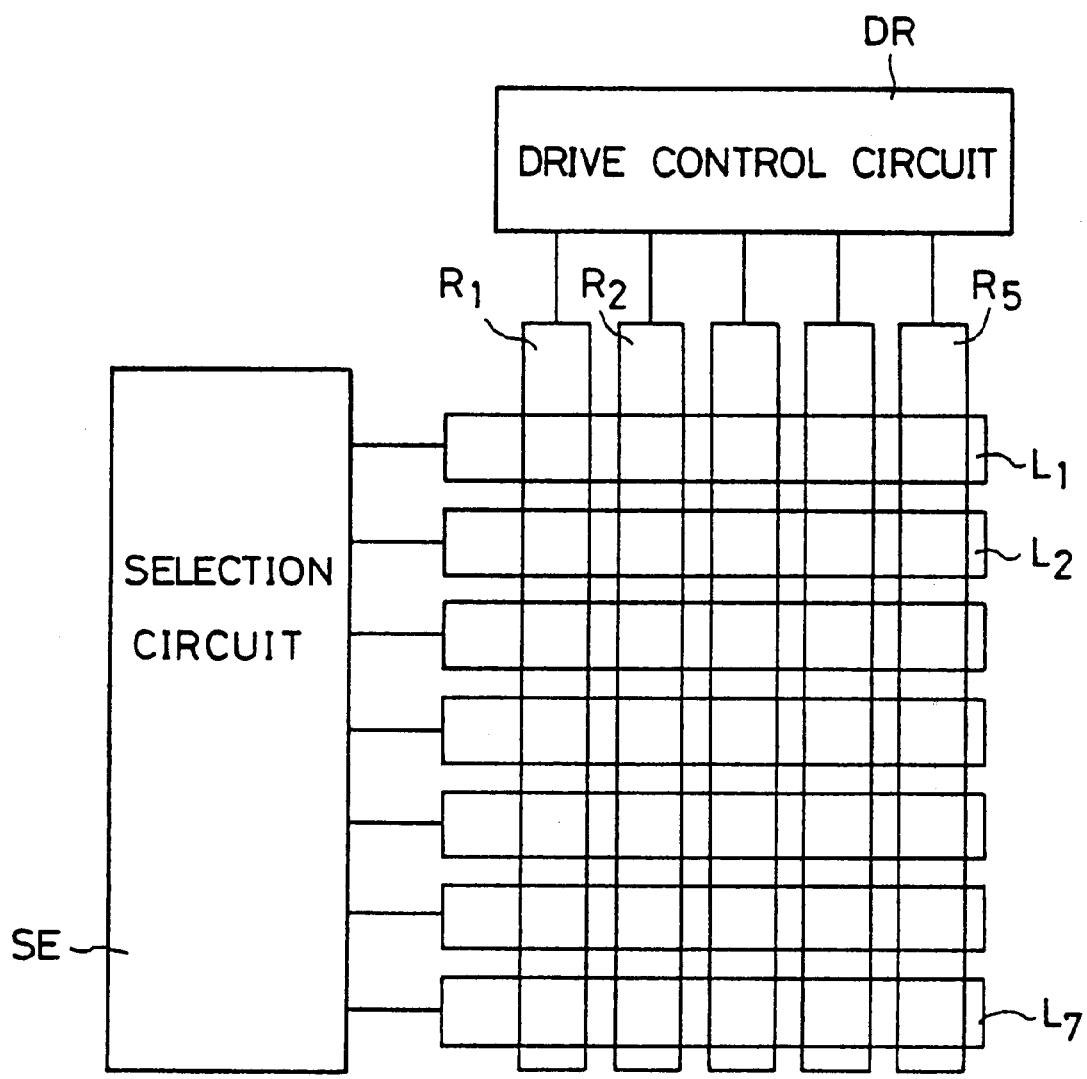
FIG. 1 shows an embodiment of a display device.
Figure 2:
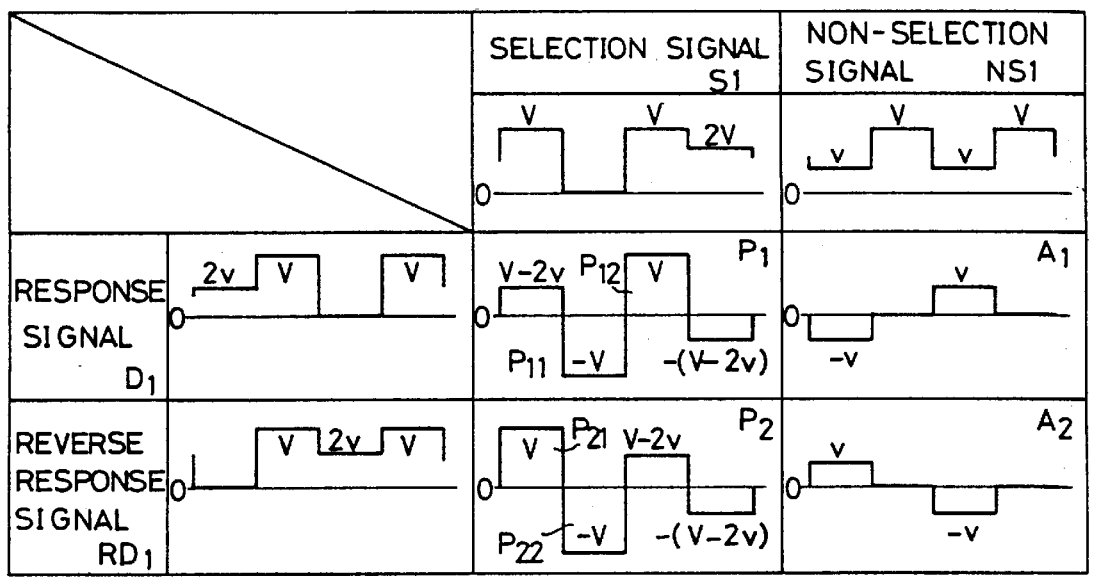
FIGS. 2–25 respectively show voltage waveforms for realizing the present invention.

In FIG. 1 and FIG. 2, a selection circuit SE generates a selection signal $S_1$ (FIG. 2) which is sequentially supplied to a group of row electrodes $L_1$–$L_7$ on the time sharing basis to select one of the row electrodes $L_1$–$L_7$ and also generates a non-selection signal $NS_1$ which is supplied to said one of the row electrodes $L_1$–$L_7$ while the selection signal $S_1$ is not supplied thereto. The selection signal $S_1$ has a waveform composed of voltages V, 2 v (desirably, $V/2 \geq v$), while the non-selection signal $NS_1$ has another waveform composed of voltages V, v.

Meanwhile, a drive control circuit DR generates a response or driving signal $D_1$ and a reverse response or reverse driving signal $RD_1$ having different waveforms from each other as shown in FIG. 2 and supplies such signals to a group of columns electrodes R1–R5. Namely, it supplies the response signal $D_1$ to a column electrode connected to a response display or a picture element and the reverse response signal $RD_1$ to another column electrode connected to a reverse response display element.

With supply of these such signals, $R_1$ and $RD_1$ a pulse group or train $P_1$ is which is to be set to one of two different response conditions applied to the response display element, which is to be set to one or two different response conditions while a pulse group $P_2$ is applied to the reverse response display element which is to be set to the other of two different response conditions. In the pulse group $P_1$, pulse shapes of which are determined according to the waveform difference between the selection signal $S_1$ and response signal $D_1$, a pulse (V–2 v) is first applied to the response display element but the liquid crystal does not respond to it but once reversely responds to the next reverse response pulse $P_{11}$ having the negative polarity such that the response display element is preset to the other response condition. Since a suceeding display control pulse $P_{12}$ having the positive polarity is applied next, to the response display element the liquid crystal thereof is saturated by the pulse $P_{12}$ such that the response display element is set to said one response condition. Thereafter, a pulse having a voltage of –(V–2 v) is applied but the liquid crystal does not respond to this voltage and does not switch to the other response condition. In the case of this pulse group $P_1$, a number of pulses in different polarities and pulse shapes of such pulses are equal, thereby forming perfect AC pulses having an average voltage of zero.

After the application of the pulse group $P_1$, an AC pulse train $A_1$ or $A_2$ is applied by the non-selection signal $NS_1$, holding the response condition. Namely, since the AC pulse trains $A_1$, $A_2$ are composed of pulses in which are determined according to the waveform difference between either of response signals $D_1$ and $RD_1$ and the non-selection signal $NS_1$ and which are the same in the pulse shape but are different only in the polarity, even when these pulses are repeatedly applied, the liquid crystal is hold under said one response condition.

On the other hand, in the pulse group $P_2$ pulse shapes of which are determined according to the waveform difference between the selection signal $S_1$ and reverse response signal $RD_1$ as opposed to the pulse group $P_1$, after the preceeding response pulse $P_{21}$ having the positive polarity is applied to the reverse response display element to preset the same to said one display condition, a succeeding display control pulse $P_{22}$ having the negative polarity is applied for setting the liquid crystal to the other response condition. Thereafter, pulses of voltages (V−2 v), −(V−2 v) are applied and thereby the other response condition is maintained. When the non-selection signal $NS_1$ is being supplied, the AC pulse train $A_1$ or $A_2$ is applied and thereby the other response condition is held.

As explained above, the pulse groups $P_1$, $P_2$ and AC pulses $A_1$, $A_2$ are all a perfect AC pulse train which has a number of pulses different in the polarity to average out the polarity to zero. Therefore, the transparent row and column electrodes are not blackened, the liquid crystal is not deteriorated and double color pigment is not discolored.

For instance, in the case of ferroelectric liquid crystal cell in the thickness of 10 μm, the saturated responsive condition and saturated reverse responsive condition or the two optically different states can be obtained by setting a voltage V=10 volts and setting a pulse duration of the display control pulse to 250 μs.

Figure 3:
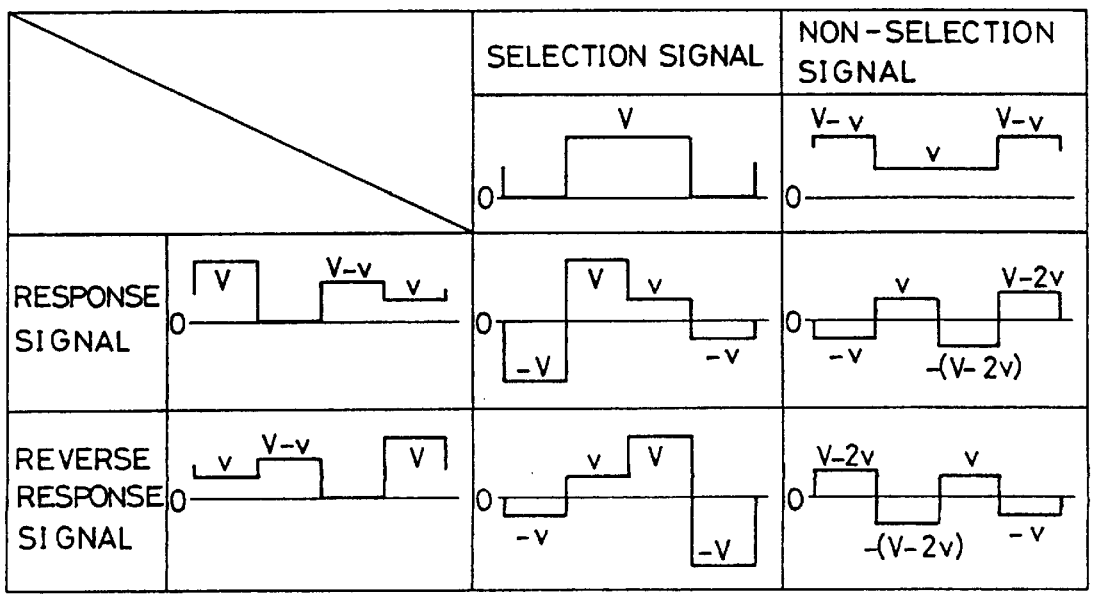
Figure 4:
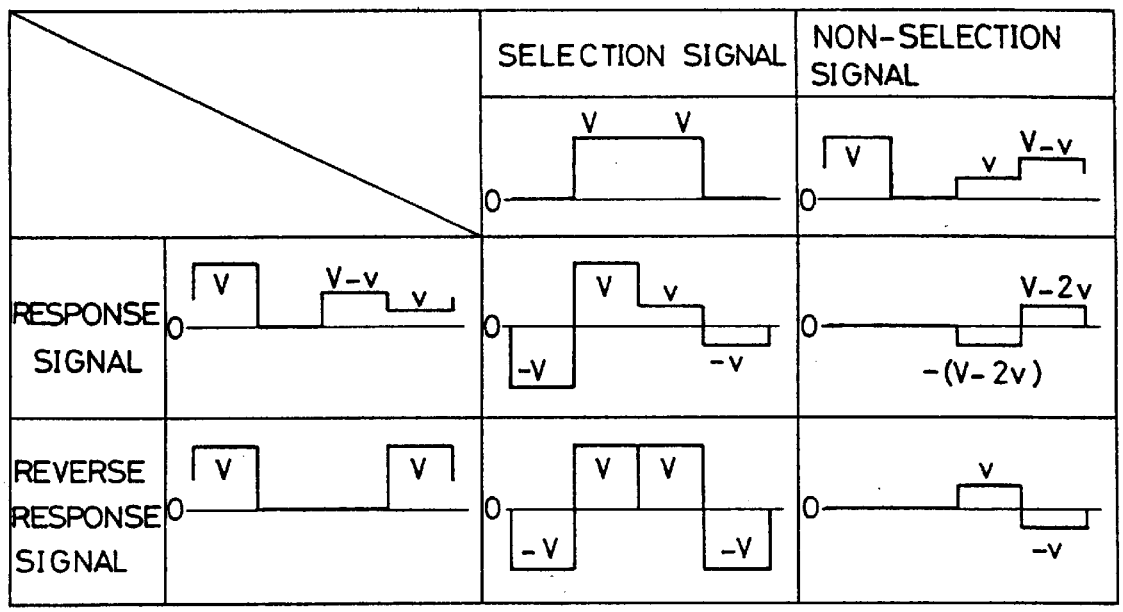

FIG. 3. and FIG. 4 indicate other examples of respective signals and these signals ensure the similar drive as in the case of FIG. 2.

Figure 5:
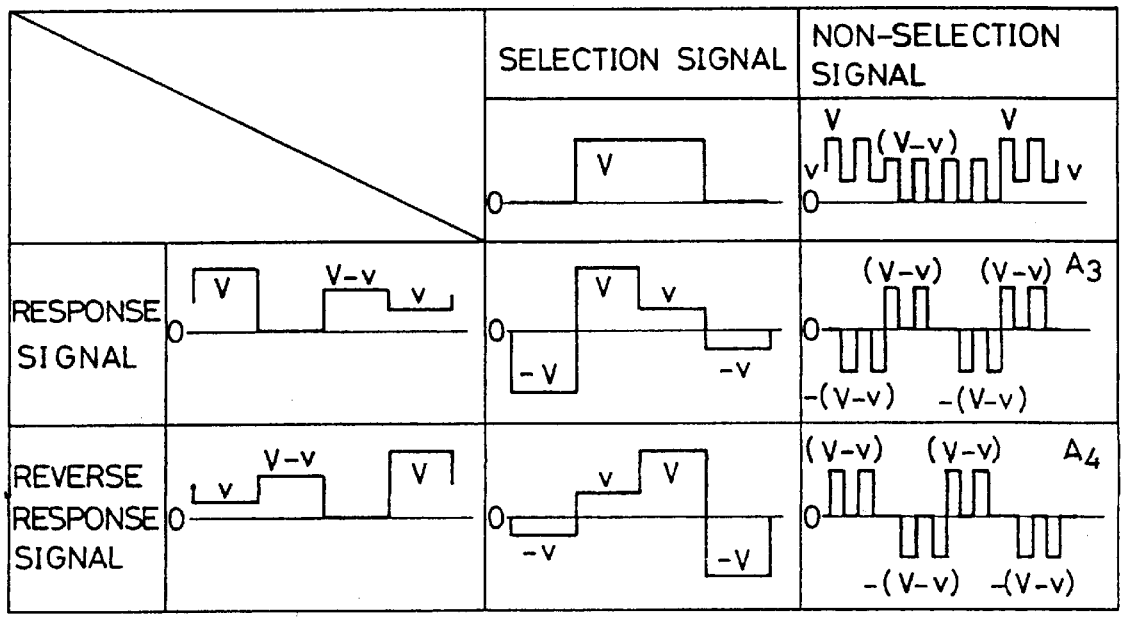
Figure 6:
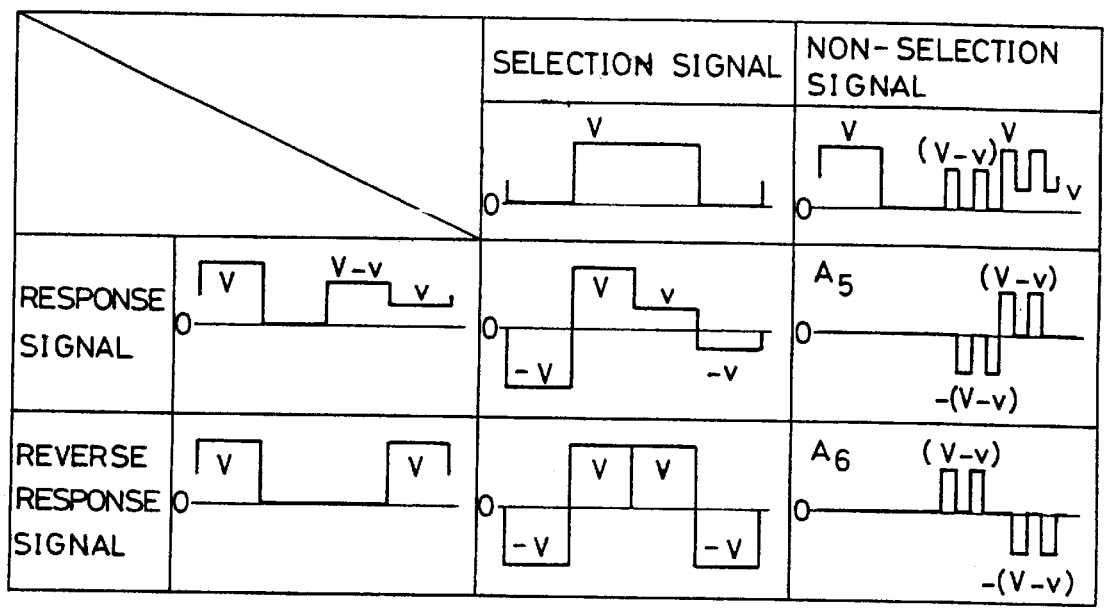

In FIG. 5 and FIG. 6, the duration of a pulse applied to the display element during non-selection period can be set to ½ or less of the duration of the display control pulse by changing the waveform of non-selection signal. Namely, waveforms in FIG. 5 and FIG. 6 are respectively similar to those modified from the non-selection signals of the examples in FIG. 3 and FIG. 4 and the AC pulses $A_3$ or $A_4$ and $A_5$ or $A_6$ of small duration are applied as shown in the figure during the non-selection period. Therefore, as compared with the examples of FIG. 2 to FIG. 4, the response condition or reverse response condition of display element can be acquired more reliably and an allowance for temperature change and variation of cell thickness becomes large.

In the examples of FIG. 2 to FIG. 6, when an AC pulse is applied, following the pulse group including the display control pulse, the pulses of the same polarity are sometimes applied continuously. Namely, in FIG. 2, for example, since the polarity of the last pulse of the pulse groups $P_1$, $P_2$ is the same as that of the first pulse of the AC pulse $A_1$, the pulse of the same polarity are applied in succession when the pulse group $P_1$ or $P_2$ is switched to the AC pulse $A_1$. It is a factor for reducing the margin for temperature change and cell thickness variation.

Figure 7:
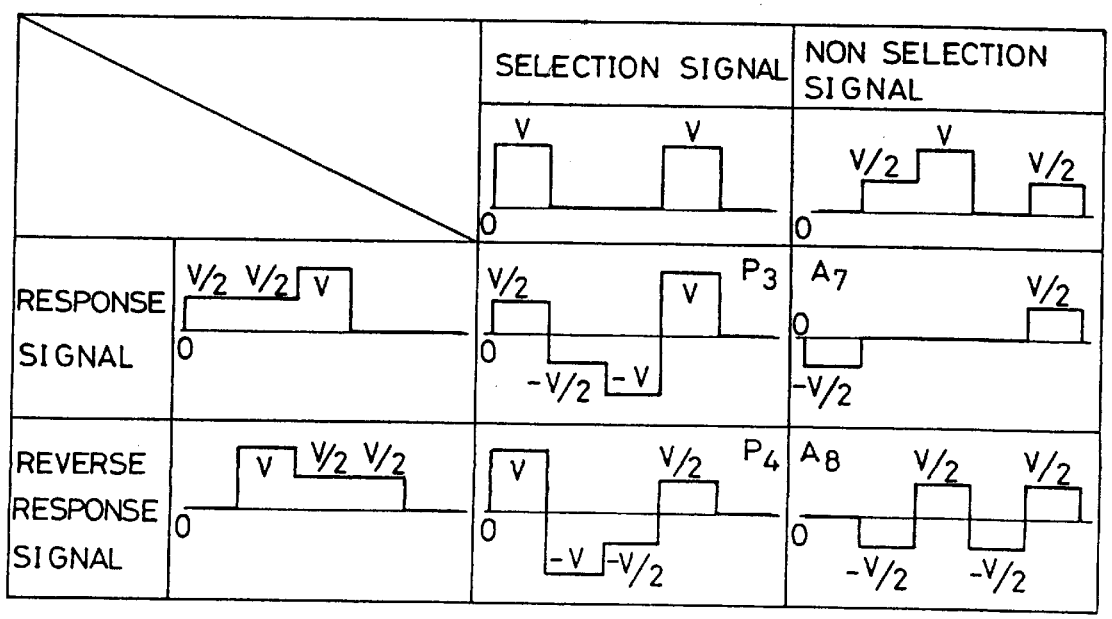
Figure 8:
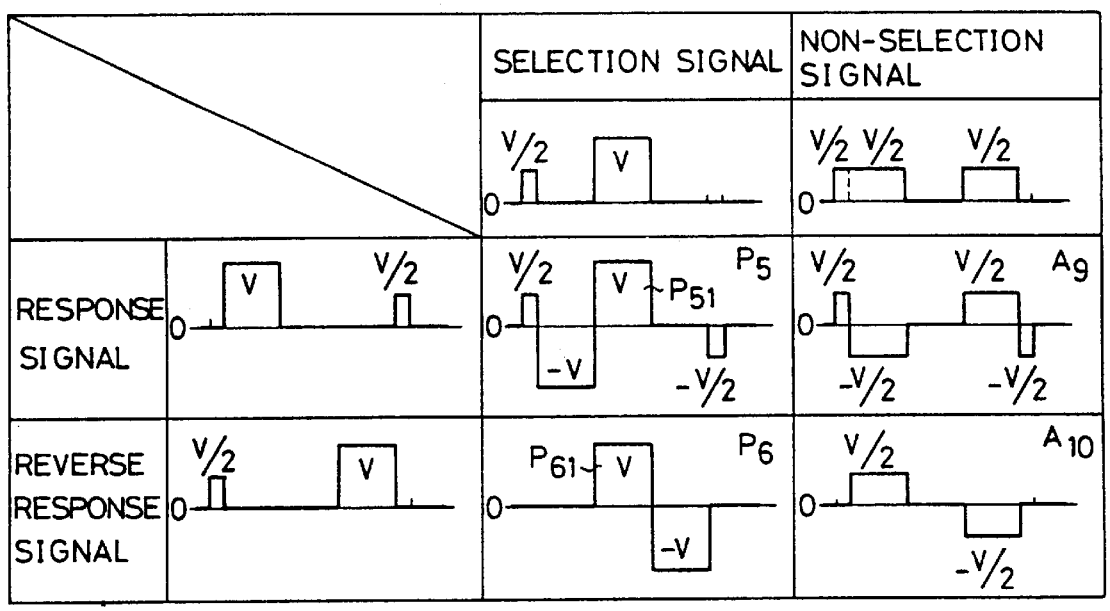
Figure 9:
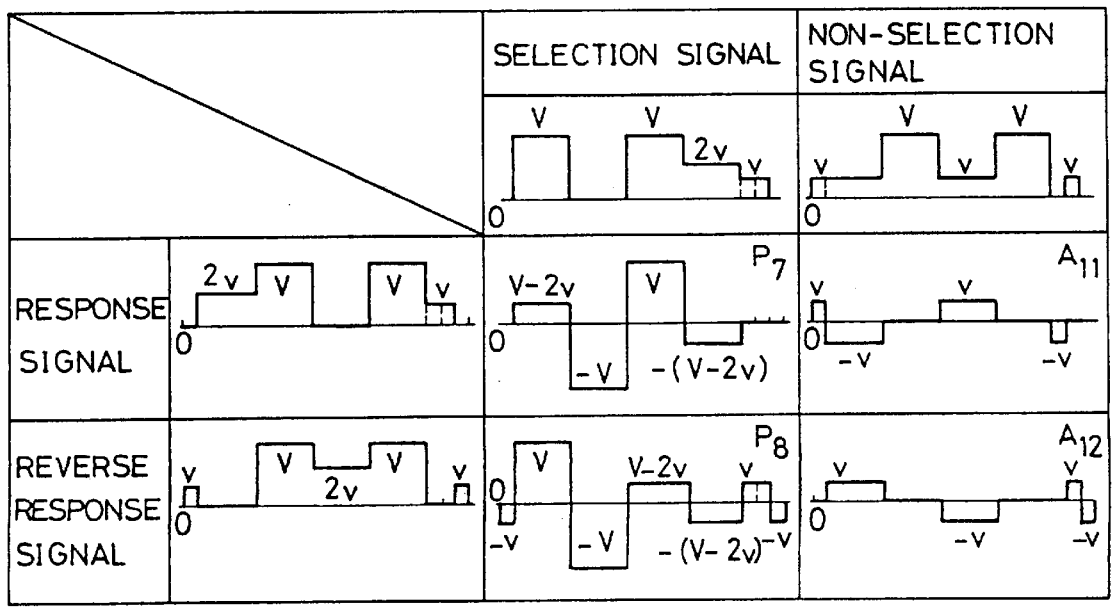

The examples shown in FIG. 7 to FIG. 9 are proposed for eliminating such disadvantage. In FIG. 7, the polarity of the last pulses of pulse groups $P_3$, $P_4$ is the same and it is the reverse polarity to that of the first pulses of the AC pulses $A_7$, $A_8$. Thereby, the pulses of the same polarity are never applied successively and thereby the margin becomes large.

In an example of FIG. 8, the last pulses of pulse groups $P_5$, $P_6$ are reversed in polarity from the first pulses of AC pulses $A_9$, $A_{10}$, by adding a narrow pulse having a voltage of V/2 or voltage 0 to the leading part or trailing part of each signal.

FIG. 9 shows the waveforms wherein a narrow pulse in voltage of v or voltage 0 is added to the leading part or trailing part of each signal shown in the example of FIG. 2. Thereby, the last pulses of the pulse groups $P_7$, $P_8$ are reversed in polarity from the first pulses of the AC pulses $A_{11}$, $A_{12}$.

Moreover, in the examples of FIG. 7 to FIG. 9, the waveforms and number of pulses are the same in the pulses in different polarities and perfect AC driving can be realized.

The same effect can also be obtained by adding the pulse similar to that in FIG. 9 to the examples of FIG. 3 to FIG. 6.

Figure 10:
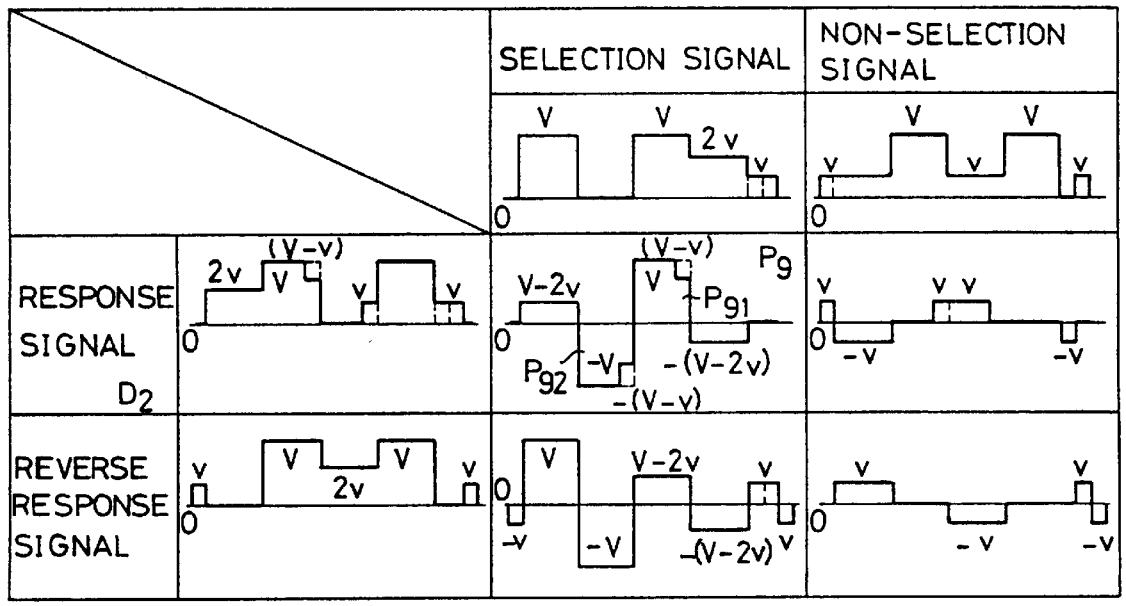

An example of obtaining the intermediate tone of display by giving gradation to the display. FIG. 10 is an example for generating intermediate tone by controlling the waveforms of response signals in the example of FIG. 9 in accordance with the gradation. Namely, a part of the first voltage V of the response signal $D_2$ is removed to form a voltage (V−v) and simultaneously a voltage v which has the same duration as that removed above is added to the next voltage V. Thereby, a part of the display control pulse $P_{91}$ of the pulse group $P_9$ is removed and the pulse $P_{92}$ which has the reverse polarity and the same waveform to said pulse is also removed. Therefore, the intermediate tone can be freely generated by controlling the width of such voltage pulse to be removed in accordance with the gradation. Moreover, the perfect AC driving can be realized using the pulses having the same waveform and numbers but are different in the polarities.

Figure 11:
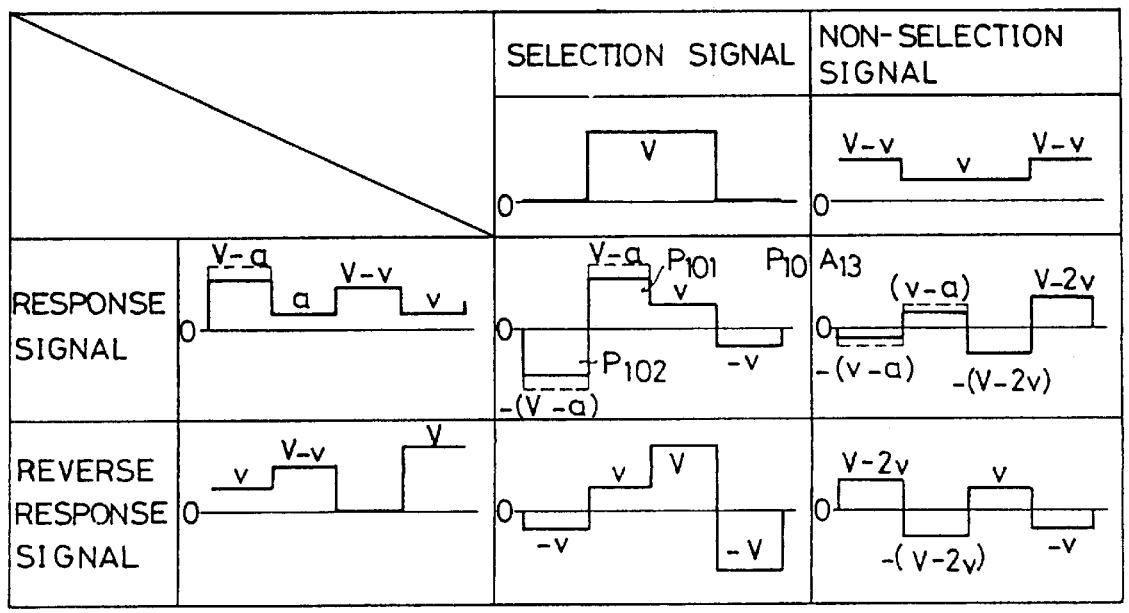

FIG. 11 shows an example for obtaining the intermediate tone in the example of FIG. 3. In this example, a voltage V of the response signal $D_3$ is set to (V−a) (a is a voltage corresponding to the gradation) and the next voltage 0 is change to a voltage (a). Thereby, the voltage of the display control pulse $P_{101}$ of pulse group $P_{10}$ drops to (V−a), generating the intermediate tone. In this case, the pulse $P_{102}$ which is in the reverse polarity and same waveform as the display control pulse $P_{101}$ also drops by only a voltage (a), maintaining the perfect AC driving. Moreover, since the first two pulses of the AC pulse $A_{13}$ drops only by a voltage (a), the margin for temperature change improves. Moreover, in this example, the circuit structure can be simplified because it is enough to change only a voltage.

The intermediate tone can also be generated by this method even in the case of examples of FIG. 3 to FIG. 7. In other words, this method can be adapted only when the display control pulse for obtaining the response condition, a pulse which is different therefrom only in the polarity, the display control pulse for obtaining the reverse response condition and a pulse which is different therefrom only in the polarity are, respectively, shifted in time. In other words, as in the case of example shown in FIG. 8, this method cannot be adopted when the display control pulse $P_{51}$ of the pulse group $P_5$ is overlapped in timing on the pulse $P_{61}$ of the pulse group $P_6$.

However, above two kinds of methods for generating the intermediate tone have difficulty in displaying dynamic images. For example, in the example shown in FIG. 11, when the pulse group $P_{10}$ is applied to the display elements in the saturated response condition, the liquid crystal is once set to the unsaturated reverse response condition by the pulse $P_{102}$ and is then set to the unsaturated response condition by the pulse $P_{101}$ from the condition. However, when the pulse group $P_{10}$ is first applied to the display elements in the saturated reverse response condition, the saturated reverse response condition is maintained by the pulse group $P_{102}$, and since the pulse $P_{101}$ is applied in this condition, the liquid crystal is set to the unsaturated response condition which is different from that described above.

Therefore, the final response condition depends on the preceding condition and it is difficult to obtain the desired response condition.

Figure 12:
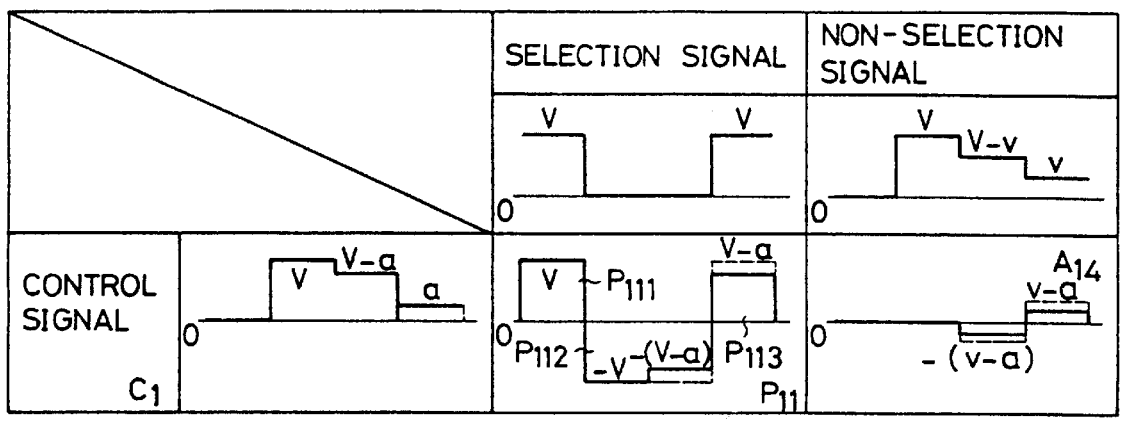

In the following example, the desired intermediate tone can be generated, irrespective of the preceding condition. In FIG. 12, the selection signal is sequentially supplied to the electrodes $L_1$–$L_7$ like the above examples and the non-selection signal is also supplied during the non-selection period. Meanwhile, the control signal $C_1$ is supplied to the electrodes $R_1$–$R_5$. The control signal $C_1$ is composed of voltages 0, V, (v–a) and (a) and the voltage (a) is changed in accordance with the gradation. After the response pulse $P_{111}$ is applied in accordance with a voltage difference between the selection signal and control signal $C_1$, the reverse response pulse $P_{112}$ is supplied. Therefore, the liquid crystal is once set to the saturated reverse response condition, irrespective of the preceding condition, and thereby initialization is carried out. Accordingly, the desired response condition can be obtained by the display control pulse $P_{113}$ of voltage (V–a).

When the intermediate tone is thus obtained, such condition is kept by the AC pulse $A_{14}$.

For instance, when a voltage (a) is set to 0, the pulse $P_{113}$ becomes voltage V to set the saturated response condition. When the voltage of (a) is set to V, the pulse $P_{113}$ becomes 0 and the saturated reverse response condition is held by the pulse $P_{112}$.

As explained above, the liquid crystal is once set to the saturated reverse response condition before the pulse for generating the intermediate tone and therefore stabilized intermediate tone can be obtained even in the display of quickly moving images.

Figure 13:
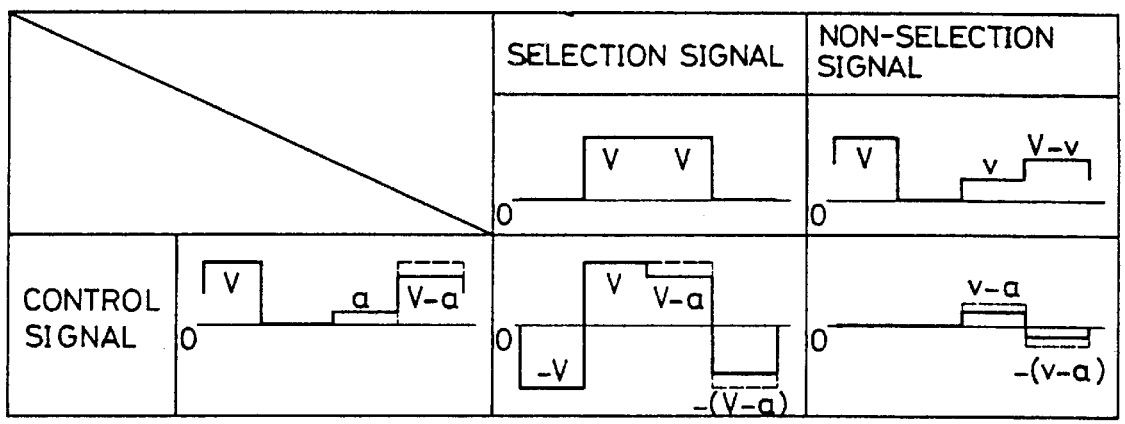

FIG. 13 shows the polarities of voltages applied which are reversed from those in FIG. 12.

Figure 14:
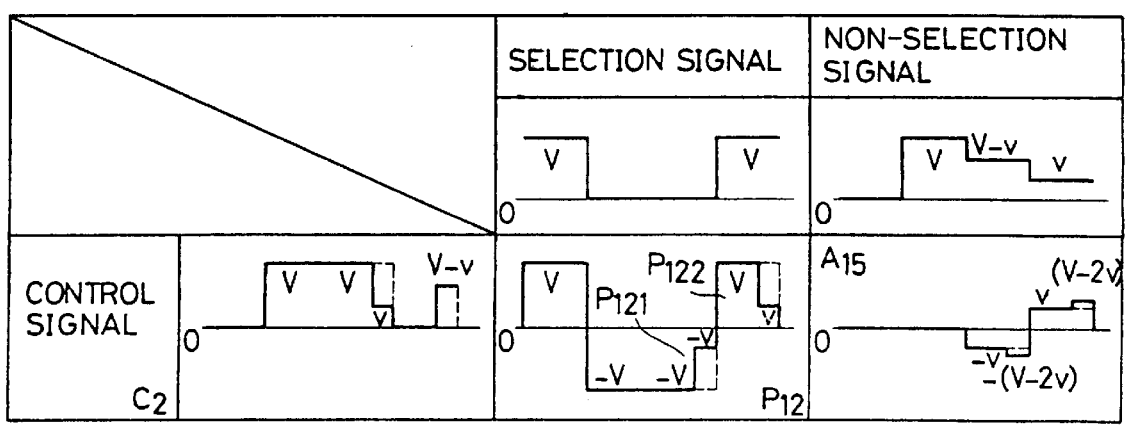
Figure 15:
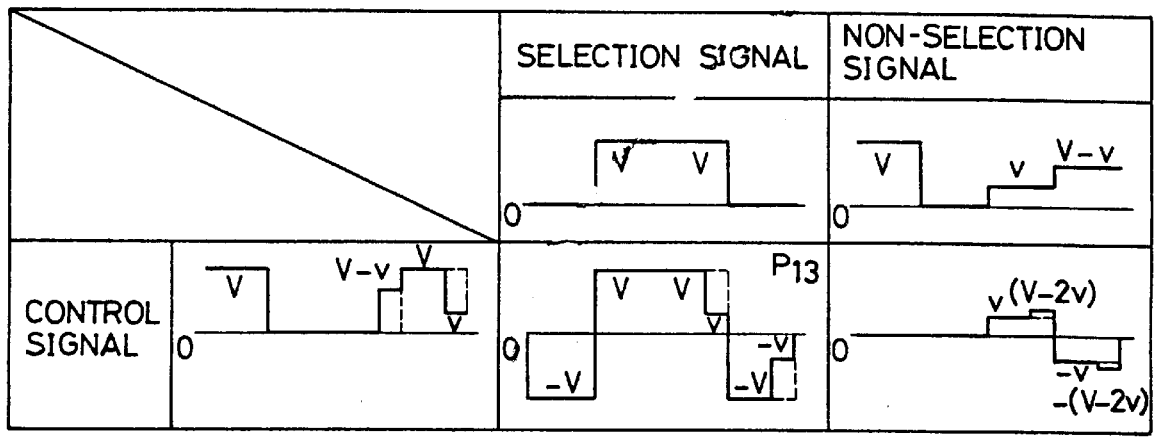

FIG. 14 and FIG. 15 show the examples for generating the intermediate tone by adjusting a pulse duration. The control signal $C_2$ in FIG. 14 is a modification of the control signal $C_1$ in FIG. 12. In this case, the durations of voltages V and (V–v) are controlled in accordance with gradation. Thereby, the pulse $P_{121}$ and $P_{122}$ of pulse group $P_{12}$ become the stepwise wave of voltages V and v and duration of voltage V changes in accordance with gradation, generating the intermediate tone. The AC pulse $A_{15}$ also becomes the stepwise wave and since this pulse is same as the above pulse and is different only in the polarity, above intermediate tone can be held.

In FIG. 15, the pulse group $P_{13}$ in the opposite polarity to the pulse in FIG. 14 is applied for display.

Figure 16:
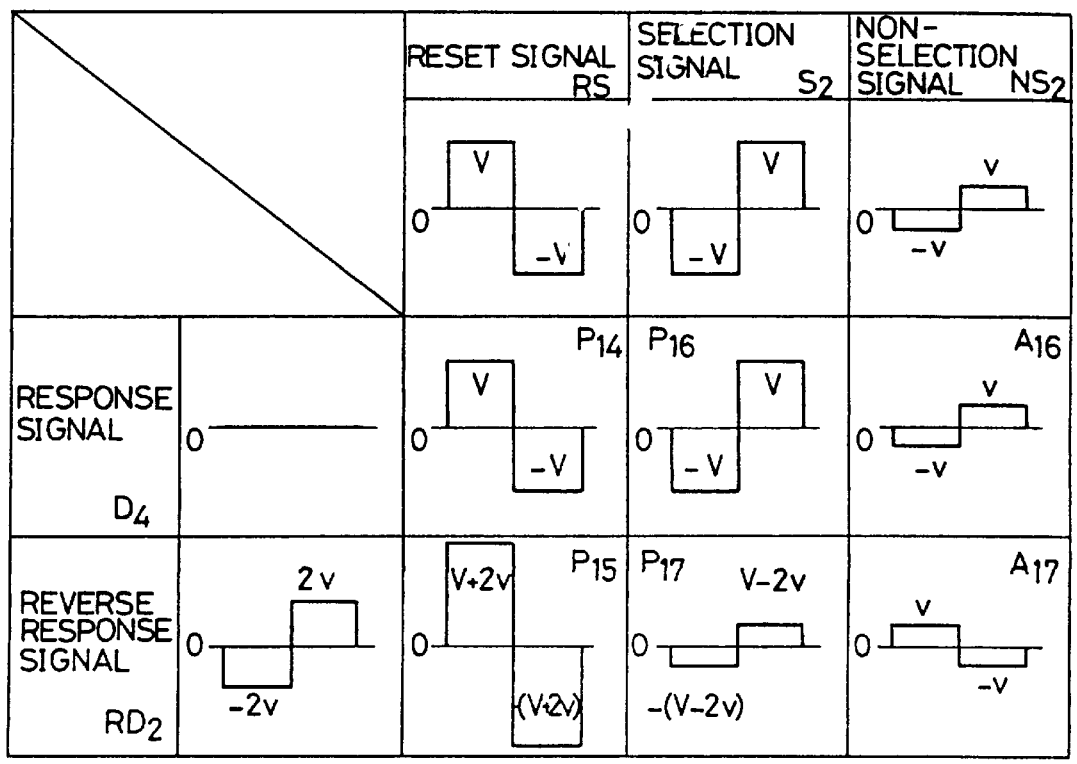

Explained hereunder is an example where display is once initialized at the timing before supplying the selection signal and thereafter the condition is changed. In FIG. 16, the selection signal $S_2$ consisting of voltages –V and V is sequentially supplied to the electrodes $L_1$–$L_7$ in FIG. 1, and the reset signal RS consisting of voltages V and –V is supplied at the preceding timing. During non-selection period, the non-selection signal $NS_2$ consisting of voltages –V and v (desirably, $V/4 \leq v \leq V/2$) is supplied.

Meanwhile, the response signal $D_4$ in voltage 0 or the reverse response signal $RD_2$ consisting of voltages –2V and 2V is supplied to the electrodes $R_1$–$R_5$.

First, the pulse group $P_{14}$ or $P_{15}$ is applied by the supply of the reset signal RS and thereby the liquid crystal is once reset to the saturated reverse response condition. Moreover, it is then set to the response condition by applying the pulse group $P_{16}$ with the selection signal $S_2$ and response signal $D_4$, while it is set to the reverse response condition by applying the pulse group $P_{17}$ with the selection signal $S_2$ and reverse response signal $RD_2$. The pulse group $P_{17}$ is used for holding the saturated reverse response condition by the pulse group $P_{15}$.

When the non-selection signal $NS_2$ is supplied, the AC pulse $A_{16}$ or $A_{17}$ is applied, maintaining the response condition or reverse response condition.

According to this example, each signal supply period becomes ½ of that in the previous examples and therefore a number of digits to be scanned in the same period can also be doubled, realizing the multi-digit driving. In other words, the single scanning time can be curtailed to ½ for the same number of digits, crosstalk can be reduced and contrast can be improved.

Figure 17:
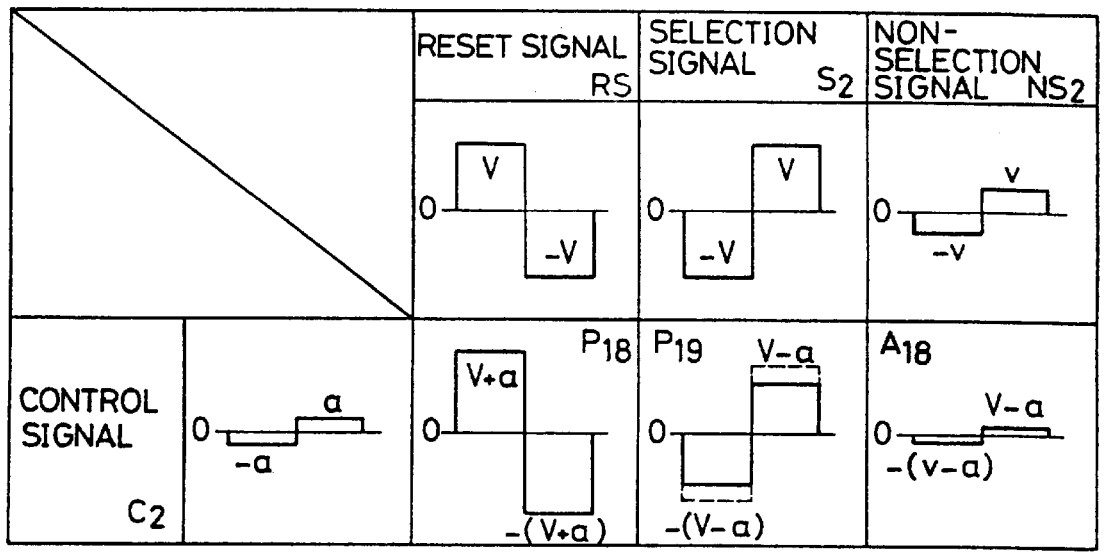
Figure 18:
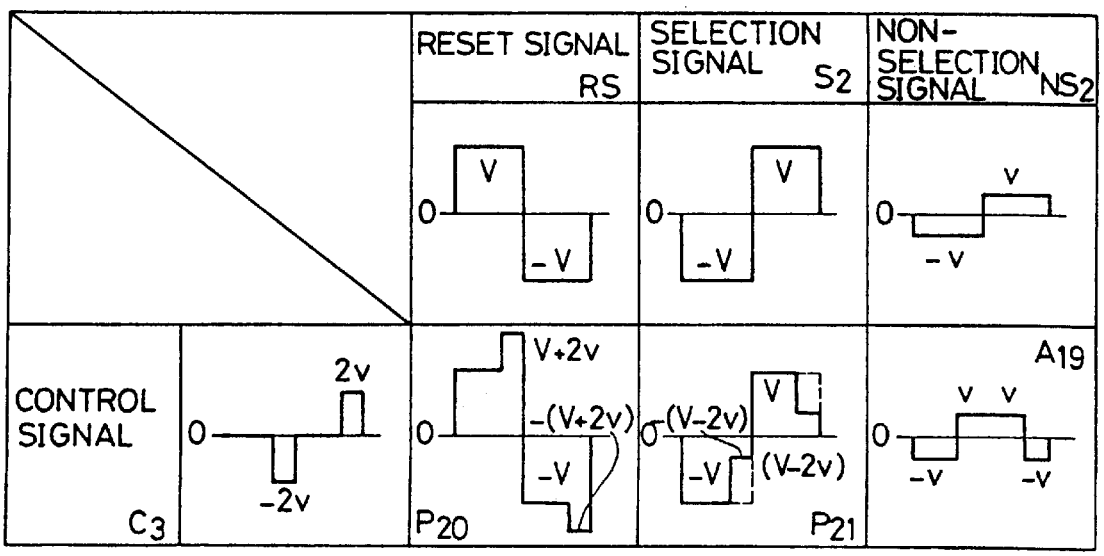

FIG. 17 and FIG. 18 show the examples for generating the intermediate tone utilizing the example of FIG. 16. In FIG. 17, the reset signal, selection signal and non-selection signal are the same as those in FIG. 16 and a voltage (a) of control signal $C_2$ to be supplied to the electrodes $R_1$–$R_5$ is controlled or modulated in accordance with the gradation. The pulse group $P_{18}$ of voltages (V+a) and –(V+a) is applied according to the reset signal RS and control signal $C_2$ and the liquid crystal is reset to the saturated reverse response condition. Thereafter, the pulse group $P_{19}$ of voltages –(V–a) and (V–a) is applied in accordance with the selection signal $S_2$ and control signal $C_2$ and thereby desired response condition can be obtained. The AC pulse $A_{18}$ of voltages –(v–a) and (v–a) is applied in accordance with the non-selection signal $NS_2$ and control signal $C_2$ and thereby the response condition can be held.

In FIG. 18, the gradation is obtained by adjusting pulse duration and durations of voltages 2 v, –2 v of the control signal $C_3$ are adjusted in accordance with the gradation. Thereby, as in the case described above, the liquid crystal is reset to the saturated reverse response condition by the pulse group $P_{20}$. Thereafter, it is set to the desired intermediate response condition by the pulse group $P_{21}$ and this response condition is held by the AC pulse $A_{19}$. The pulse group $P_2$ is capable of generating the desired intermediate tone since the durations of voltages V and –V changes in accordance with the gradation.

In the examples of FIG. 17 and FIG. 18, the liquid crystal is reset to the saturated reverse response condition before rewriting of display and therefore stable intermediate tone can be generated irrespective of the preceding response condition.

Explained hereunder is an example where a high frequency AC pulse is superposed on the non-selection signal.

Figure 19:
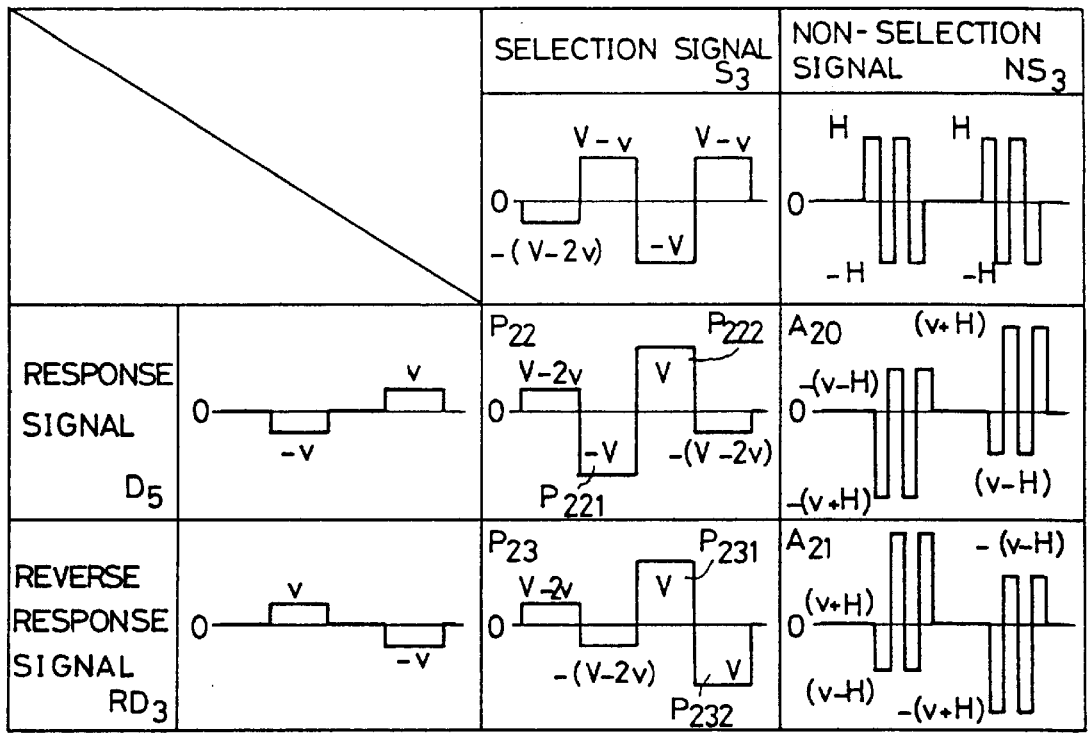
Figure 20:
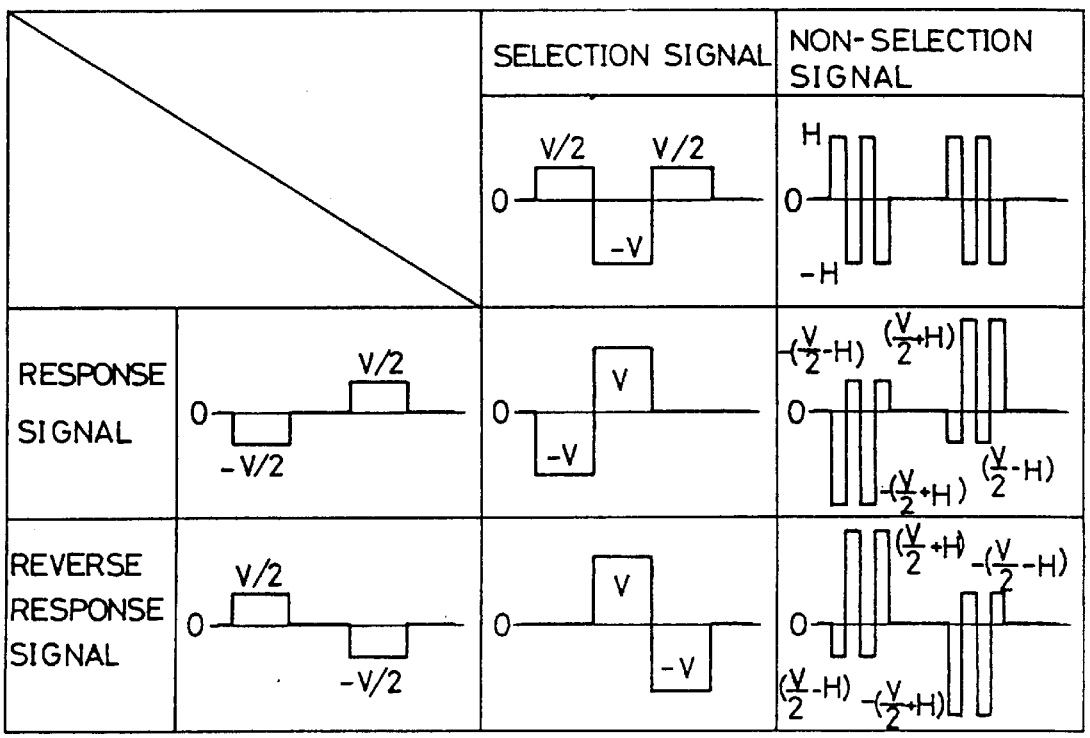
Figure 21:
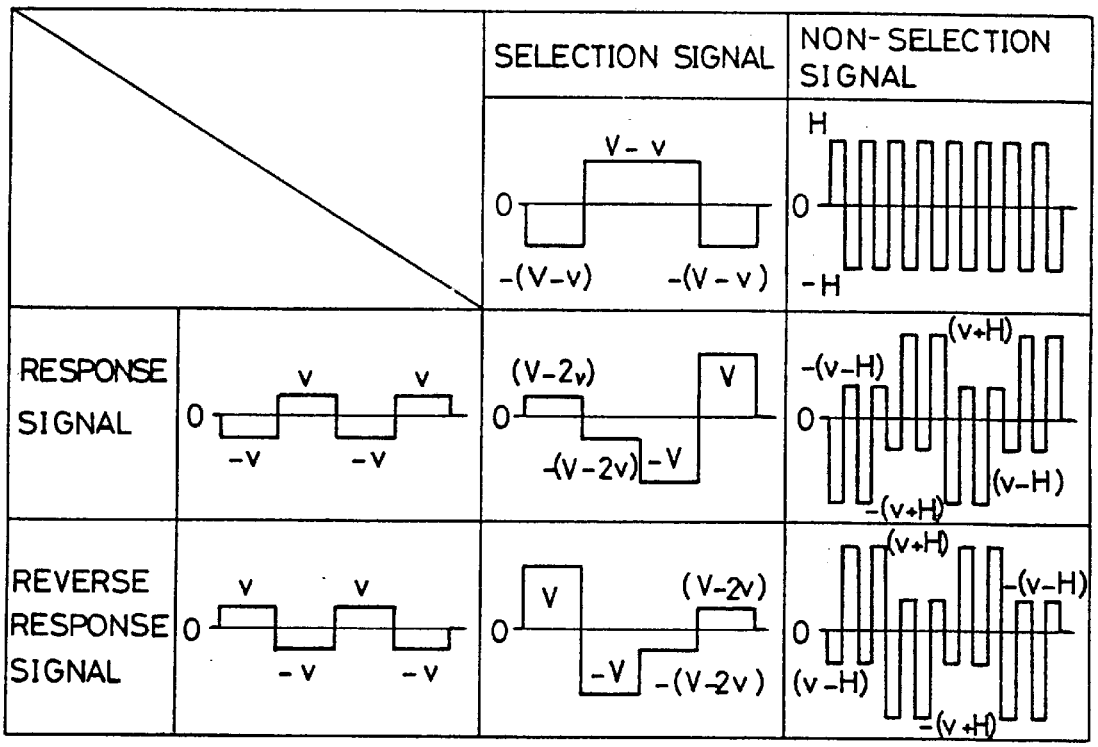
Figure 22:
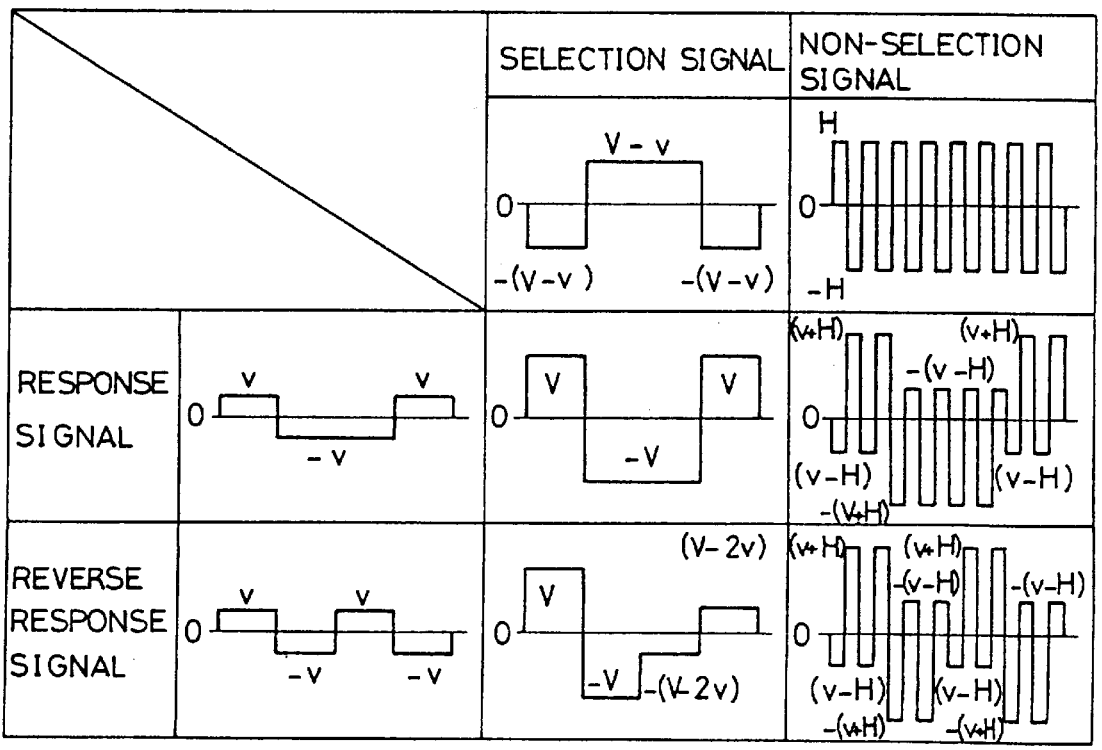

In FIG. 19, while the selection signal $S_3$ is not supplied, the non-selection signal $NS_3$ is generated. The selection signal $S_3$ is composed of voltages –(V–2 v), (V–v), –V and the non-selection signal $NS_3$ is composed of the AC pulses of voltages 0, H.

The response signal $D_5$ or reverse response signal RD3 is supplied to the other electrodes $R_1$–$R_5$. Namely, the response signal $D_5$ is supplied to the column electrode of response display element, while the reverse response signal $RD_3$ is applied to the other column electrode of the reverse response display element.

With supply of above signals, the pulse group $P_{22}$ is applied to the response display element, while the pulse group $P_{23}$ is applied to the reverse response display element. In the case of pulse group $P_{22}$, a pulse of voltage (V–2 v) is applied but the liquid crystal does not respond to it. When next reverse response pulse $P_{221}$ is applied, the liquid crystal once reversely responds to it. But, since the display control pulse $P_{222}$ is applied next, the liquid crystal is set to the saturated response condition. Thereafter, a pulse of voltage –(V–2 v) is applied, but the liquid crystal does not respond to this pulse and is not set to the reverse response condition.

In the pulse group $P_{22}$, the pulses are the same in the number and waveform but are different in the polarities and the perfect AC pulses are obtained.

After the pulse group $P_{22}$ is applied, an AC pulse $A_{20}$ or $A_{21}$ which is obtained by superposing a high frequency AC pulse to a pulse ±v which is lower than the response pulse V is applied and thereby the response condition can be held. Namely, since the AC pulses $A_{20}$, $A_{21}$ are composed or the narrow AC pulses which are the same in the waveform but different only in the polarity, the liquid crystal is held at the response condition even when such pulse is applied repeatedly. Particularly in the case of ferroelectric liquid crystal having negative dielectric anisotropy, a stably holding force can be obtained because the high frequency AC pulse causes the liquid crystal molecules to be arranged in parallel to the electrode substrate.

Meanwhile, in the case of pulse group $P_{23}$, after the pulse of ±(V−2v) to which the liquid crystal does not respond is applied, the response pulse $P_{231}$ is applied, on the contrary to the pulse group $P_{22}$. Next, the display control pulse $P_{232}$ is applied for setting the reverse response condition. While the non-selection signal $NS_3$ is supplied, the AC pulse $A_{20}$ or $A_{21}$ is applied and the reverse response condition is held.

As described above, since the pulse groups $P_{22}$, $P_{23}$ and the AC pulses $A_{20}$, $A_{21}$ are all the same in the number of pulses and waveforms in different polarities, problems such as blackening of transparent electrodes, deterioration of liquid crystal and discoloration of double-color pigment can be eliminated.

For instance, the saturated response condition or saturated reverse response condition of the ferroelectric liquid crystal in the thickness of 10 μm can be obtained by setting a voltage V to 10 volt and durattion of display control pulse to 250 μs.

It is better to set the frequency of high frequency AC pulse to two times or more (desirably, 4 times or more of integer times) as that of the response pulse frequency and a pulse amplitude H is adequately determined so that the response condition is kept stably from a relation with the dielectric anisotropy of the ferroelectric liquid crystal, but it is usually desirable that the pulse amplitude H is about the response pulse amplitude V or less.

FIG. 20, FIG. 21, FIG. 22 and FIG. 23 indicate other examples of respective signal waveforms and each example realizes the driving similar to that in FIG. 19.

Figure 23:
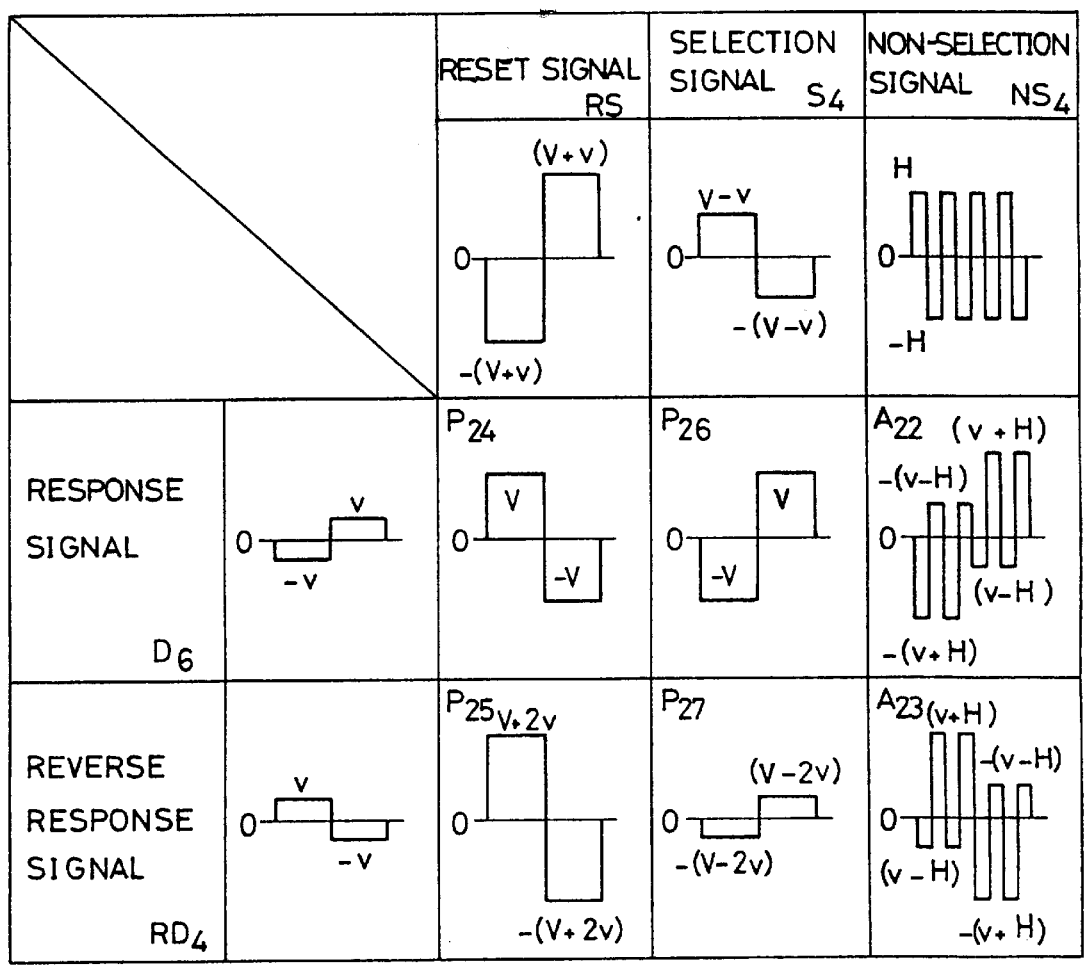

Explained next is the case where the display is once reset at the timing before supply of selection signal and thereafter condition is changed. In FIG. 23, the selection signal $S_4$ consisting of voltages of V−v and −(V−v) is sequentially supplied to the electrodes $L_1$–$L_7$ shown in FIG. 1 and the reset signal RS consisting of voltages of −(V+v) and V+v is supplied at the previous timing. During non-selection period, the non-selection signal $NS_4$ consisting of voltages of +H is supplied.

On the other hand, the response signal $D_6$ of voltages −v and v or the reverse response signal $RD_4$ of voltages of v and −v is supplied to the electrodes $R_1$–$R_5$.

First, the pulse group $P_{24}$ or $P_{25}$ is applied by the supply of the reset signal RS and thereby the liquid crystal is once reset to the saturated reverse response condition. Moreover, it is set to the response condition by applying the pulse group $P_{26}$ according to the selection signal $S_4$ and response signal $D_6$, and can also be set to the reverse response condition by applying the pulse group $P_{27}$ according to the selection signal $S_4$ and reverse response signal $RD_4$. The pulse group $P_{27}$ holds the saturated reverse response condition set by the pulse group $P_{24}$ or $P_{25}$.

When the non-selection signal $NS_4$ is supplied, the AC pulse $A_{22}$ or $A_{23}$ is applied and thereby the response condition or reverse response condition is held.

According to this example, since the supply period of each signal becomes ½ or ⅔ of that in examples described above, a number of digits to be scanned in the same period can be set to two times or 1.5 times, making possible the multi-digit drive. In other words, when the number of digits is the same, single scanning period can be ruduced to ½ or ⅔ and thereby the crosstalk can be reduced and contrast can be improved.

Figure 24:
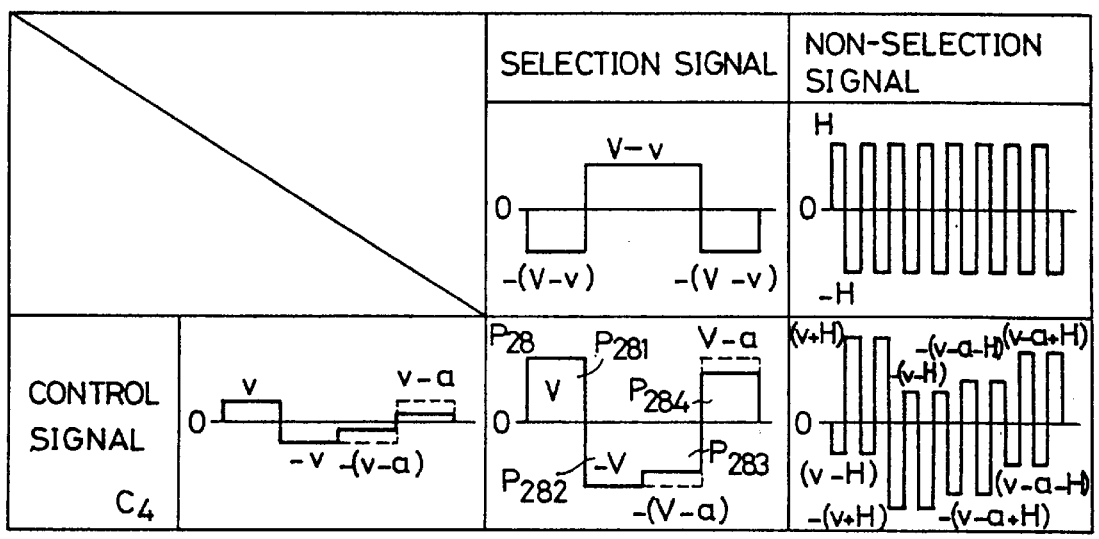
Figure 25:
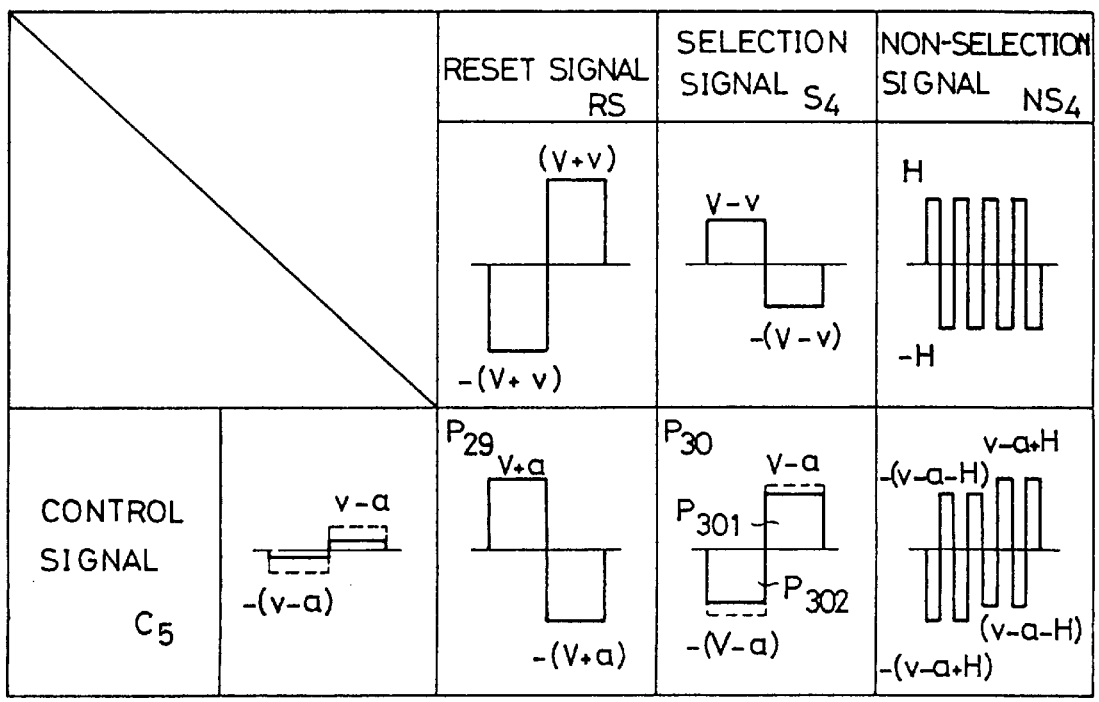

An example of displaying the intermediate tone is explained. FIG. 24 and FIG. 25 indicate the examples for generating the intermediate tone by utilizing the examples of FIG. 22 and FIG. 23. In FIG. 24 and FIG. 25, the reset signal, selection signal and non-selection signal are the same as those in FIG. 22 and FIG. 23, and a voltage (a) of the control signals $C_4$ and $C_5$ to be supplied to the electrodes $R_1$–$R_5$ is controlled in accordance with the gradation. In FIG. 24, the response pulse $P_{281}$ and reverse response pulse $P_{282}$ are first applied by a voltage difference between the selection signal and control signal $C_4$, once initializing the liquid crystal to the saturated reverse response condition. Thereafter, the saturated reverse response condition is held by the unsaturated reverse response pulse $P_{283}$ and finally the unsaturated response pulse $P_{284}$ is applied and the intermediate tone is displayed.

In FIG. 25, the condition is once reset to the saturated reverse response condition by the pulse $P_{29}$ according to the reset signal RS and control signal $C_5$, thereafter the saturated reverse response condition is held by unsaturated reverse response pulse $P_{302}$ in accordance with voltage difference between the selection signal $S_4$ and control signal $C_5$ and the intermediate tone is displayed by the unsaturated response pulse $P_{301}$. Thereafter, a high frequency AC pulse is applied according to the non-selection signal and control signal and said response condition can be held.

As the pulse for displaying intemediate tone, this intermediate tone can be displayed not only by modulation of voltage (a) of the control signal but also by the pulse width modulation. In any case, it is important that the liquid crystal is once reset to the saturated reverse response condition before the pulse for displaying the intermediate tone. If the pulse for displaying the intermediate tone is only supplied, the response condition is affected by the display condition before the application of pulse and thereby stable display of intermediate tone is impossible. For example, in case only the unsaturated reverse response pulse and unsaturated response pulse are applied to the picture elements in the saturated response condition in order to display the intermediate tone, the picture elements set in the unsaturated reverse response condition by the unsaturated reverse response pulse is returned to the saturated response condition by the opposite unsaturated response pulse having the same waveform as the next unsaturated reverse response pulse and thereby unsaturated response condition (intermediate tone) cannot be displayed in some cases.

However, in the examples of FIG. 24 and FIG. 25, since the liquid crystal is initialized to the saturated reverse response condition before rewriting of display, the intermediate tone can be displayed stably irrespective of the preceding response condition.

In the above explanation, response is used for a positive voltage while "reverse response" for a negative voltage, but "reverse response" is used for a positive voltage while "response" for a positive voltage because the "response" and "reverse response" are relative to front side and rear side of the display.

The signals supplied to the electrodes are not limited only to those described above and these signals can be modified and moreover a bias voltage can be added adequately when required.

In addition to the drive of ferroelectric liquid crystal device, the present invention can be adapted to any type of devices which controls the display condition in accordance with the direction of applied electric field and which changes the response rate in accordance with field intensity and pulse duration, such as a display device utilizing ferroelectric electro-optical modulation material such as PLZT, etc. and a display device (EPID) utilizing electrophoresis.

It is certain that color display can be realized by driving a display device comprising a color filter for three colors of red, green and blue by the method of the present invention.

According to the present invention, in the pulse group to be applied to the display elements, the pulses in different polarities are the same in the waveform and numbers and therefore, the transparent electrodes are not blackened, the double color pigment is not discolored and liquid crystal is not deteriorated even after the driving for a long period of time. Moreover, since the AC pulse is applied for holding the response condition during non-selection period, contrast is not lowered even in case a number of display digits increases.

Moreover, it is also possible to display the intermediate tone which has been considered difficult and the application range can be expanded remarkably.

In addition, the duration of a period of signals to be supplied to respective electrodes can be very shortened by resetting the display at the timing before the application of selection signal, many digits can be scanned within a short period and a number of display digits can be increased remarkably. In other words, when a number of digits is the same, the rewriting time of display can be much curtailed, crosstalk can be eliminated and contrast can also be improved.

Further, the intermediate tone can easily be displayed stably, showing distinctive effect in wide areas such as display of television pictures.

Moreover, the response pulse and reverse response pulse do not include a high frequency component, therefore, driving is possible only with a low voltage. During non-selection period, since an AC pulse is superposed with a high frequency AC pulse for holding the response condition, contrast is not lowered even when a number of digits increases.

Meanwhile, in case the ferroelectric liquid crystal having negative dielectric anisotropy is used, the high frequency AC pulse component causes the liquid crystal molecules to be arranged in parallel to the electrode substrate. Accordingly, more stable holding force can be obtained and high contrast display can be realized without crosstalk. Moreover, since the low frequency bias pulse is lower than the response pulse during the non-selection period, the high frequency AC pulse is not required to have so high amplitude and a low voltage drive is possible, as a whole.

What is claimed is:

1. A method for driving a matrix type electro-optical device comprising an electro-optical modulation material which has different optical response states depending on the direction of an applied electric field and which is interposed between a plurality of scan electrodes and a plurality of control electrodes to form optical elements at intersecting points of the electrodes, the method comprising the steps of:

selectively supplying an initializing signal and a succeeding selection signal to one of the scan electrodes and supplying a non-selection signal to the one scan electrode when the initializing signal and selection signal are not supplied thereto;

supplying data signals to the control electrodes synchronously with the supply of the selection signal to the one scan electrode for specifying the optical response state of each of the optical elements at the one scan electrode;

applying an initializing pulse group comprised of a plurality of pulses to the optical elements to optically initialize the same by means of a potential difference between the initializing signal and the data signals;

applying a first pulse group to the optical elements by means of a potential difference between the selection signal and the data signals to set the optical elements to desired optical response states, wherein a symmetrical negative polarity pulse necessarily exists opposite to each positive polarity pulse; and maintaining the optical response states of the optical elements by applying a second pulse group to the optical elements by means of a potential difference between the non-selection signal and the data signals;

the initializing pulse group setting the optical elements to a light-transmitting state or a light-shading state, and wherein a symmetrical negative polarity pulse necessarily exists opposite to each positive polarity pulse;

the first pulse group containing a first writing pulse for setting the optical elements to a first optical response state and a second writing pulse for setting the optical elements to a second optical response state, the first writing pulse and the second writing pulse having the same pulse waveform but opposite polarities, wherein the second writing pulse is applied before applying the first writing pulse when the first optical response state is to be written and the first writing pulse is applied before applying the second writing pulse when the second optical response state is to be written; and the second pulse group comprising pulses for maintaining optical response states of the optical elements, and wherein a symmetrical negative polarity pulse necessarily exists opposite to each positive polarity pulse.

2. A method for driving a matrix type electro-optical device according to claim 1; wherein the second pulse group contains a period during which the voltage is zero.

3. A method for driving a matrix type electro-optical device according to claim 2; further comprising the steps of modulating the waveform of one of the first and second writing pulses by changing the waveform of the data signals in accordance with a desired gradation of the optical elements; and modulating the waveform of the other one of the first and second writing pulses which has an inverse polarity and which is symmetrical to that of the one writing pulse in the first pulse group so that it becomes symmetrical to the modulated waveform of the one writing pulse.

4. A method for driving a matrix type electro-optical device according to claim 3; wherein the second pulse group contains a period during which the voltage is zero.

5. A method for driving a matrix type electro-optical device comprising an electro-optical modulation material which has different optical response states depending on the direction of an applied electric field, including an AC stabilizing field, and which is interposed between a plurality of scan electrodes and a plurality of control electrodes to form optical elements at intersecting points of each electrode, the method comprising the steps of:

selectively supplying an initializing signal and a succeeding selection signal to one of the scan electrodes and supplying a non-selection signal to the one scan electrode when the initializing signal and the selection signal are not supplied thereto;

supplying data signals to the control electrodes synchronously with the supply of the selection signal to the one scan electrode for specifying the optical response state of each of the optical elements at the one scan electrode;

applying an initializing pulse group consisting of a plurality of pulses to the optical elements to optically initialize the optical elements by means of a potential difference between the initializing signal and the data signals;

applying a first pulse group to the optical elements by means of a potential difference between the selection signal and the data signals to set the optical elements to desired optical response states; and maintaining the optical response states of the optical elements utilizing an AC stabilizing effect by applying a second pulse group to the optical elements by means of a potential difference between the non-selection signal and the data signals;

the initializing pulse group setting the optical elements to a light transmitting state or a light-shading state, and wherein a symmetrical negative polarity pulse necessarily exists opposite to each positive polarity pulse;

the first pulse group containing writing pulses for setting the optical elements to the desired optical response states initialized by the initializing pulse group and wherein a symmetrical negative polarity pulse necessarily exists opposite each positive polarity pulse; and the second pulse group comprises pulses having a frequency adequate for maintaining optical response states of the optical elements by an AC stabilizing effect and wherein a symmetrical negative polarity pulse necessarily exists opposite to each positive polarity pulse.

6. A method for driving a matrix type electro-optical device according to claim 5; wherein the symmetrical negative polarity pulse and the positive pulse are generated alternately in the second pulse group.

7. A method for driving a matrix type electro-optical device comprising an electro-optical modulation material which has different optical response states depending on the direction of an applied electric field, and which is interposed between a plurality of scan electrodes and a plurality of control electrodes to form optical elements at intersecting points of each electrode, the method comprising the steps of:

selectively supplying an initializing signal and a succeeding selection signal to one of the scan electrodes and supplying a non-selection signal to the one scan electrode when the initializing signal and the selection signal are not supplied thereto;

supplying data signals to the control electrodes synchronously with the supply of the selection signal to the one scan electrode for specifying the optical response state of each of the optical elements at the one scan electrode;

applying an initializing pulse group consisting of a plurality of pulses to the optical elements to optically initialize the optical elements by means of a potential difference between the initializing signal and the data signals;

applying a first pulse group to the optical elements by means of a potential difference between the selection signal and the data signals to set the optical elements to desired optical response states; and maintaining the optical response states of the optical elements by utilizing an AC stabilizing effect by applying a second pulse group to the optical elements by means of a potential difference between the non-selection signal and the data signals;

the initializing pulse group setting the optical elements to a light transmitting state or a light-shading state, and wherein a symmetrical negative polarity pulse necessarily exists opposite to each positive polarity pulse;

the first pulse group containing writing pulses for setting the optical elements to the desired optical response states or pulses for maintaining the optical response states initialized by the initializing pulse group and wherein a symmetrical negative polarity pulse necessarily exists opposite each positive polarity pulse; and the second pulse group comprising pulses having a frequency adequate for maintaining optical response states of the optical elements by an AC stabilizing effect and wherein a symmetrical negative polarity pulse necessarily exists opposite to each positive polarity pulse.

8. A method for driving a matrix type electro-optical device according to claim 7; wherein the symmetrical negative polarity pulse and the positive polarity pulse are generated alternately in the second pulse group.

9. A method for driving a matrix type electro-optical device comprising an electro-optical modulation material which has different optical response states depending on the direction of an applied electric field, including an AC stabilizing field, and which is interposed between a plurality of scan electrodes and a plurality of control electrodes to form optical elements at intersecting points of each electrode, the method comprising the steps of:

selectively supplying a plurality of initializing pulses and a succeeding selection signal to one of the scan electrodes and supplying a non-selection signal to the one scan electrode when the initializing pulses and the selection signal are not supplied, wherein the time duration of each initializing pulse is equal to the time duration of individual pulses of the selection signal;

supplying data signals to the control electrodes synchronously with the supply of the selection signal to the one scan electrode for specifying the optical response state of each of the optical elements at the one scan electrode;

applying an initializing pulse group consisting of a plurality of pulses to the optical elements to optically initialize the optical elements by means of a potential difference between the initializing signal and the data signals;

applying a first pulse group to the optical elements by means of a potential difference between the selection signal and the data signals to set the optical elements to desired optical response states; and maintaining the optical response states of the optical elements utilizing an AC stabilizing effect by applying a second pulse group to the optical elements by means of a potential difference between the non-selection signal and the data signals;

the initializing pulse group setting the optical elements to a light transmitting state or a light-shading state, and wherein a symmetrical negative polarity pulse necessarily exists opposite to each positive polarity pulse;

the first pulse group containing one of a plurality of writing pulses for setting the optical elements to the desired optical response states and a plurality of holding pulses for maintaining the optical response states initialized by the initializing pulse group and wherein a symmetrical negative polarity pulse necessarily exists opposite to each positive polarity pulse; and the second pulse group comprising pulses having a frequency adequate for maintaining optical response states of the optical elements utilizing an AC stabilizing effect, and wherein a symmetrical negative polarity pulse necessarily exists opposite each positive polarity pulse.

10. A method for driving a matrix type electro-optical device according to claim 9; wherein the symmetrical negative polarity pulse and the positive polarity pulse are generated alternately in the second pulse group.

11. A method for driving a ferroelectric liquid crystal optical matrix having a plurality of pixels, comprising the steps of:

applying to a group of pixels a first pulse group containing pulses having a first initializing pulse to set the liquid crystal to a saturated response condition and a second initializing pulse to set the liquid crystal to a saturated reverse response condition, the first initializing pulse and the second initializing pulse having the same pulse waveform but opposite polarities;

applying to selected pixels within the group of pixels a second pulse group successively after applying the first pulse group, the second pulse group containing pulses having the same waveform but different polarities so as to hold the liquid crystal to the saturated reverse response condition;

applying to the other pixels within the group of pixels a third pulse group successively after applying the first pulse group, the third pulse group containing pulses having the same waveform but different polarities so as to change the liquid crystal to a saturated response condition; and applying to the group of pixels an AC signal successively after applying the second pulse group or the third pulse group, the AC signal having a DC bias voltage equal to 0 to thereby stabilize the response condition of the liquid crystal.

12. A method according to claim 11; wherein the ferroelectric liquid crystal shows negative dielectric anisotropy at the frequency of the AC signal.

13. A method according to claim 12; wherein the matrix comprises a group of scanning electrodes and a group of control electrodes.

14. A method according to claim 13; further comprising the step of applying selection signals to the scanning electrodes; and wherein the initialization pulses are applied to the scanning electrodes, and the second and third pulse groups are applied to the control electrodes, and the AC signal is applied to the scanning electrodes in the absence of the initialization and selection signals.

15. A method according to claim 14; further comprising the step of initializing the liquid crystal to one of the saturated response condition and the saturated reverse response condition in response to a difference in voltage between the initialization signals and the pulses in the second and third pulse groups.

16. A method according to claim 15; wherein the AC pulse is of relatively high frequency.

17. A method according to claim 16; wherein each of the first, second and third pulse groups consists of pulses having a mean voltage level of approximately 0.

18. A method according to claim 17; wherein the pulses of the second and third pulse group have the same waveform but different polarities.

* * * * *